(12) United States Patent
Lim et al.

(10) Patent No.: US 11,225,529 B2
(45) Date of Patent: Jan. 18, 2022

(54) METHOD FOR PREPARING STARCH PHOSPHATE USING PHYTATE

(71) Applicant: Korea University Research and Business Foundation, Seoul (KR)

(72) Inventors: Seung-Taik Lim, Seoul (KR); Eun Young Park, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/910,494

(22) Filed: Jun. 24, 2020

(65) Prior Publication Data
US 2021/0017298 A1    Jan. 21, 2021

(30) Foreign Application Priority Data
Jul. 16, 2019    (KR) .................. 10-2019-0085994

(51) Int. Cl.
*C08B 31/06*    (2006.01)
*A23L 29/219*    (2016.01)

(52) U.S. Cl.
CPC .......... *C08B 31/066* (2013.01); *A23L 29/219* (2016.08)

(58) Field of Classification Search
CPC ............................. C08B 31/066; A23L 29/219
See application file for complete search history.

(56) References Cited

U.S. PATENT DOCUMENTS 2,871,147 A * 1/1959 Smith ...................... C13K 1/08
127/40
3,329,673 A * 7/1967 Greidinger ............ C08B 31/066
536/109

FOREIGN PATENT DOCUMENTS

| CN | 109265572 A | 1/2019 |
|---|---|---|
| JP | 2682661 B2 | 11/1997 |
| JP | 2010-11756 A | 1/2010 |
| JP | 2015-107097 A | 6/2015 |
| KR | 0156790 B1 | 10/1998 |

OTHER PUBLICATIONS

Jang, Ho Seok et al., "Preparation and characterization of starch modified by dryheating with phytic acid", *New Paradigm for Future Food Science, Korean Society of Food Science and Technology, Kosfost International Symposium and Annual Meeting*, Jun. 26-Jun. 28, 2019, Songdo Convensia, Incheon, Republic of Korea (13 pages in English).

* cited by examiner

*Primary Examiner* — Shaojia A Jiang
*Assistant Examiner* — Everett White
(74) *Attorney, Agent, or Firm* — NSIP Law

(57) ABSTRACT

Disclosed is method for preparation of a starch phosphate using phytate. The method enables the preparation of a starch phosphate with improved physical properties such as high transparency, solubility, swelling power, and storage stability by the phosphorylation of a starch using naturally occurring phytate rather than using a synthetic chemical. Due to these advantages, the starch phosphate is expected to replace conventional chemically modified starches. In addition, the method enables the preparation of a starch phosphate based on a simple modification. The use of the starch phosphate greatly contributes to improvements in the quality and storage stability of various starchy foods. Therefore, the starch phosphate is expected to find application in the food industry, including starchy foods.

12 Claims, 9 Drawing Sheets
(7 of 9 Drawing Sheet(s) Filed in Color)

METHOD FOR PREPARING STARCH PHOSPHATE USING PHYTATE

CROSS-REFERENCE TO RELATED APPLICATIONS

This application claims the benefit under 35 USC § 119(a) of Korean Patent Application No. 10-2019-0085994 filed on Jul. 16, 2019 in the Korean Intellectual Property Office, the entire disclosure of which is incorporated herein by reference for all purposes.

BACKGROUND OF THE INVENTION

1. Field of the Invention

The present invention relates to a method for preparing a starch phosphate, and more specifically to a method for preparing a starch phosphate with improved physical properties by phosphorylating a starch using naturally occurring phytate.

2. Description of the Related Art

Native starches are not widely utilized in the food industry due to their many disadvantages such as retrogradation of starch gels and poor stability against heat, shear, and freezing. Thus, native starches need to be modified to overcome their disadvantages.

Numerous physical, chemical, enzymatic, and biotechnological methods can be applied for starch modification. Particularly, starch has been chemically modified because of their ability to best overcome the disadvantages of native starches and to impart excellent characteristics to modified starches.

According to such chemical modification methods, various functional groups are introduced into starches to produce desired characteristics. Phosphorylation is widely known as an approach to chemical modification. Phosphorylation can be used to produce stabilized starches (e.g., starch monophosphates) and crosslinked starches (e.g., starch phosphate diesters). Starch monophosphates have high clarity, solubility and swelling power. Crosslinked starches are very stable against external factors such as acids, heat, and shear but are less swellable and transparent. Based on these characteristics, techniques for modified starches by starch phosphorylation are employed in various industry fields.

As described above, chemical methods for starch modification are still more widely utilized than physical, enzymatic, and biotechnological ones. However, with the ever increasing number of people who have an aversion to chemicals, there has been growing interest in methods for modified starches as potential replacements for chemically modified starches.

Under the above background, the present inventors have earnestly conducted research to develop a method for preparing a starch phosphate using a naturally occurring substance rather than using a synthetic chemical, and as a result, have found that naturally occurring phytate can be used to prepare a starch phosphate with greatly improved physical properties such as high transparency, solubility, swelling power, and storage stability. The present invention has been accomplished based on this finding.

SUMMARY OF THE INVENTION

The present invention has been made in an effort to solve the problems of conventional method for chemically modified starches prepared using synthetic chemicals and intends to provide a method for preparing a starch phosphate with improved physical properties such as high transparency, solubility, swelling power, and storage stability by using naturally occurring phytate.

Specifically, an object of the present invention is to provide a method for preparing a starch phosphate including (a) dispersing a mixture of phytate and starch in a solution to prepare a phytate-starch dispersion, (b) drying the phytate-starch dispersion to obtain a phytate-starch powder, and (c) heating the phytate-starch powder to induce a reaction between the phytate and the starch.

An aspect of the present invention provides a method for preparing a starch phosphate with improved physical properties such as high transparency, solubility, swelling power, and storage stability by using naturally occurring phytate.

Specifically, the method of the present invention includes (a) dispersing a mixture of phytate and starch in a solution to prepare a phytate-starch dispersion, (b) drying the phytate-starch dispersion to obtain a phytate-starch powder, and (c) heating the phytate-starch powder to induce a reaction between the phytate and the starch.

The method of the present invention enables the preparation of a starch phosphate using naturally occurring phytate with improved physical properties such as high transparency, solubility, swelling power, and storage stability Based on advantages of using phytate as a natural material, phytate-mediated phosphorylation is expected to replace a conventional phosphorylation method using synthetic chemicals.

In addition, the method of the present invention enables the preparation of a starch phosphate based on a simple modification. The use of the starch phosphate greatly contributes to improvements in the quality and storage stability of various starchy foods. Therefore, the starch phosphate prepared using phytate is expected to find applications in the food industry.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

DETAILED DESCRIPTION OF THE INVENTION

Figure 1:
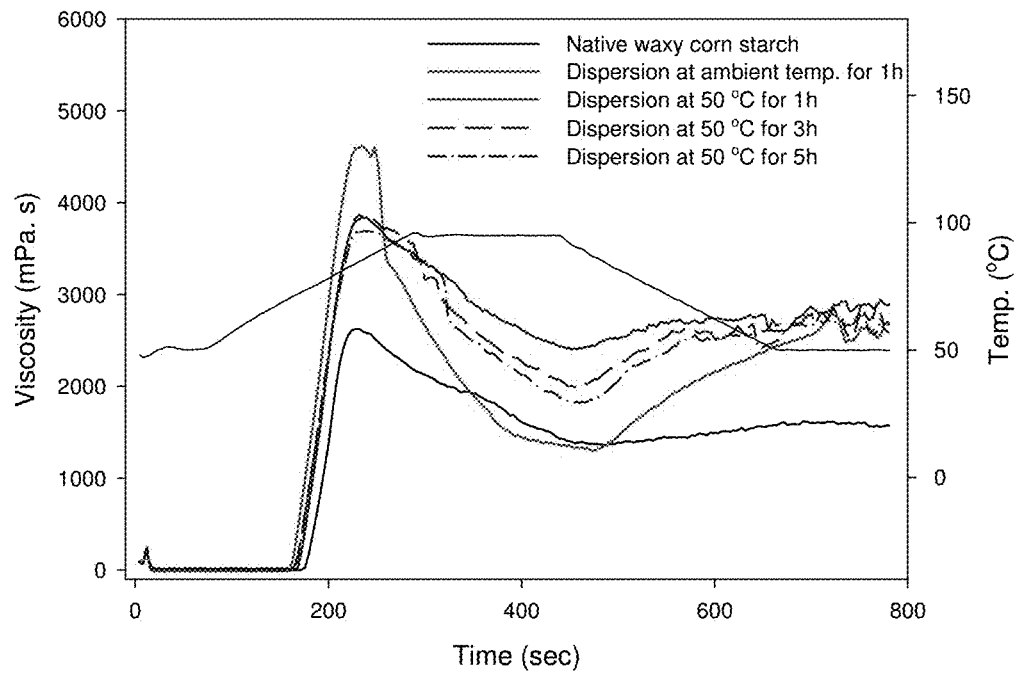
FIG. 1 graphically shows the pasting properties of waxy corn starch phosphates prepared using phytate under different dispersion temperature and time conditions in Example 1-1, which were measured using a rapid visco analyzer (RVA).

Unless otherwise defined, all technical and scientific terms used herein have the same meaning as commonly understood by one of ordinary skill in the art to which this invention belongs. In general, the nomenclature used herein is well known and commonly employed in the art.

In one aspect, the present invention is directed to a method for preparing a starch phosphate including (a) dispersing a mixture of phytate and starch in a solution to prepare a phytate-starch dispersion, (b) drying the phytate-starch dispersion to obtain a phytate-starch powder, and (c) heating the phytate-starch powder to induce a reaction between the phytate and starch.

The method of the present invention may further include (d) neutralizing and washing the phytate-starch reaction product obtained in step (c).

The method of the present invention may further include (e) drying and pulverizing the washed phytate-starch reaction product.

In step (a), a mixture of phytate and starch is dispersed in a solution to prepare a phytate-starch dispersion. The dispersion is preferably performed by stirring phytate and starch at ambient temperature to a temperature lower than the pasting temperature of the starch (approximately 40-60° C.) for 30 minutes to 2 hours, but is not necessarily limited to these conditions.

Step (a) is preferably carried out at pH of 7 to 10 to improve the modification yield of the final starch phosphate, which can be seen from the results in the Examples section that follows. Accordingly, the pH of the solution is preferably in the range of 7 to 10. Any solution that is the pH range defined above may be used without limitation. Preferably, the solution is a sodium bicarbonate ($NaHCO_3$) buffer or a sodium hydroxide (NaOH) solution. Since the starch-phytate mixture is dispersed at a pH of 7 to 10, a gelatinization inhibitor may be added during the dispersion. The gelatinization inhibitor is preferably sodium sulfate ($Na_2SO_4$). The gelatinization inhibitor is preferably used in an amount of 1 to 10% (w/w), based on the weight of the starch.

The concentration of the phytate-starch dispersion is preferably from 50 to 70% (w/w). If the concentration of the phytate-starch dispersion is less than 50% (w/w), the dispersion is not efficiently dried in the subsequent step. Meanwhile, if the concentration of the phytate-starch dispersion exceeds 70% (w/w), the starch particles tend to aggregate due to their poor dispersibility, making it difficult for the phytate to be uniformly distributed in the dispersion.

Phytate is used in an amount of 1 to 5% (w/w), based on the weight of the starch. If the amount of the phytate is less than 1% (w/w), the modification efficiency of the final starch phosphate is not satisfactory. Meanwhile, if the amount of the phytate exceeds 5% (w/w), a further improvement in the modification efficiency of the final starch phosphate is not expected.

The starch may be a native starch such as cereal starch, root and tuber crop starch, rhizome starch, bean starch or fruit starch, or its modified starch. The starch is preferably selected from the group consisting of native starches, including normal corn starch, waxy corn starch, high amylose corn starch, rice starch, waxy rice starch, high amylose rice starch, potato starch, sweet potato starch, tapioca starch, sorghum starch, wheat starch, sago starch, chestnut starch, bean starch, and mixtures, and modified starches thereof. More preferably, the starch is normal corn starch, waxy corn starch, rice starch or waxy rice starch.

In step (b), the phytate-starch dispersion is dried to obtain a phytate-starch powder. The drying process is selected from the group consisting of natural drying, freeze-drying, vacuum drying, and drying at constant temperature and humidity, but is not limited thereto. The drying temperature is not limited as long as it causes no damage to the starch. The drying temperature is preferably in the range of 30 to 80° C. Within this range, improved drying efficiency is achieved and damage to the starch is minimized More preferably, the drying temperature is 40° C.

The method may further include, prior to step (c), pulverizing the phytate-starch powder obtained in step (b), which is advantageous for uniform heating in subsequent step (c). The pulverized phytate-starch powder is homogenized through a 100-500 μm sieve.

In subsequent step (c), the phytate-starch powder is heated to induce a reaction between phytate and starch. The reaction induces phosphorylation of starch. The heating is performed at 110 to 130° C. for 2 to 24 hours. If the heating temperature is lower than 110° C., the reaction efficiency may not be satisfactory. Meanwhile, if the heating temperature is higher than 130° C., the starch may be thermally degraded, resulting in browning and low molecularization. If the heating time is shorter than 2 hours, the reaction efficiency may not be satisfactory. Meanwhile, if the heating time is longer than 24 hours, the reaction efficiency does not increase any more.

Next, in step (d), the phytate-starch reaction product obtained in step (c) is neutralized and washed. Specifically, the phytate-starch reaction product is dispersed in water, neutralized with a hydrochloric acid solution (0.5-1 M) or sodium hydroxide (1 M), and centrifuged to collect the reaction products. The centrifugation is preferably performed at 2500 to 4500 rpm for 10 to 30 minutes. After first centrifugation, the starch phosphate is collected and washed with water. This purification (washing and centrifuging) is 1 to 5 times repeated to remove residual phytate that does not participate in the reaction and the chemicals used in the reaction, leaving only the desired starch phosphate behind.

Finally, in step (e), the collected phytate-starch reaction product is dried and pulverized. The drying is preferably performed at a temperature of 30 to 50° C. and the pulverized product is preferably homogenized using a 100-500 μm sieve.

In a further aspect, the present invention is directed to a starch phosphate prepared by the method.

The starch phosphates may be used in food processing without further purification. Other suitable sugars and food additives may be optionally added to the starch phosphate. Alternatively, the starch phosphate may be further modified.

In another aspect, the present invention is directed to a food composition including the starch phosphate prepared using phytate. The food is selected from the group consisting of breads, noodles, confectionery, sauces, sausages, and beverages, but is not limited thereto.

EXAMPLES

The present invention will be explained in more detail with reference to the following examples. It will be appreciated by those skilled in the art that these examples are merely illustrative and the scope of the present invention is not construed as being limited to the examples. Thus, the substantial scope of the present invention should be defined by the appended claims and their equivalents.

Materials and Methods

Starches

Normal corn starch and waxy corn starch received from Daesang (Korea), waxy rice starch received from Remy (Belgium), and normal rice starch received from General food product (Thailand) were used in the following experiments.

Phytate

Phytate (sodium salt form of phytic acid) extracted from rice was purchased from Sigma Aldrich and used in the following experiments.

Example 1: Preparation of Starch Phosphates Using Phytate and Measurement of Pasting Properties Depending on Preparation Conditions 1-1. Measurement of Pasting Properties of Starch Phosphate at Different Dispersion Temperature and Time Waxy corn starch dispersion (40 wt %) was prepared with phytate (2%, w/w, starch basis) in a buffer at pH 10. The starch-phytate dispersion was stirred under four different conditions: 1) at ambient temperature for 1 h and 2) at 50° C. for 1 h, 3) at 50° C. for 3 h, and 4) at 50° C. for 5 h. Then, each of the dispersions was dried in a convection oven at 40° C. and powdered. The powder was heated at 120° C. for 6 h, dispersed in water for neutralization, washed three times with water, and dried in a convection oven at 40° C. to prepare a starch phosphate. The starch phosphate was pulverized before use in the following experiments.

Then, the pasting viscosities of the native starch and the starch phosphates whose concentrations were adjusted to 7.0% (2.1 g based on the total weight (30 g)) in dispersion were measured using a rapid visco analyzer (RVA, Newport Scientific Inst., Australia). The temperature profile of rapid visco analyzer was as follows: initial temperature 50° C., maintenance at 95° C. for 3 min, final temperature 50° C. The total analysis time was 15 min. The results are shown in FIG. 1.

As shown in FIG. 1, there is differences in the viscosity of starch phosphate by dispersing starch-phytate mixture at different temperature (ambient temperature and 50° C.). But the all starch phosphates prepared using phytate showed increased viscosity like conventionally phosphorylated starch. There were no significant differences in pasting properties depending on the dispersion times but a longer dispersion time led to a larger reduction in viscosity after gelatinization. These results reveal that when the dispersion time increased at a temperature of 50° C., the integrity of the starch granules might be decreased rather than the binding between the phytate and the starch was induced. Thus, starch phosphates dispersed at 50° C. for 1 h were used in the following experiments.

1-2. Measurement of Pasting Properties of Starch Phosphate at Different pH of Dispersion (1) First, waxy corn starch dispersion (40 wt %) was prepared in distilled water or a 0.1 M buffer at pH 10. Each of the dispersions was mixed with 2 wt % of phytate with respect to the weight of the starch. The mixture was dispersed with stirring at 50° C. for 1 h. Then, the dispersion was dried in a convection oven at 40° C. and powdered. The powder was heated at 120° C. for 6 h, dispersed in water for neutralization, washed three times with water, and dried in a convection oven at 40° C. to prepare a starch phosphate. The starch phosphate was pulverized before use in the following experiments.

Next, the pasting properties of the starch phosphate were measured by the same procedure as described in 1-1. The results are shown in FIG. 2.

Figure 2:
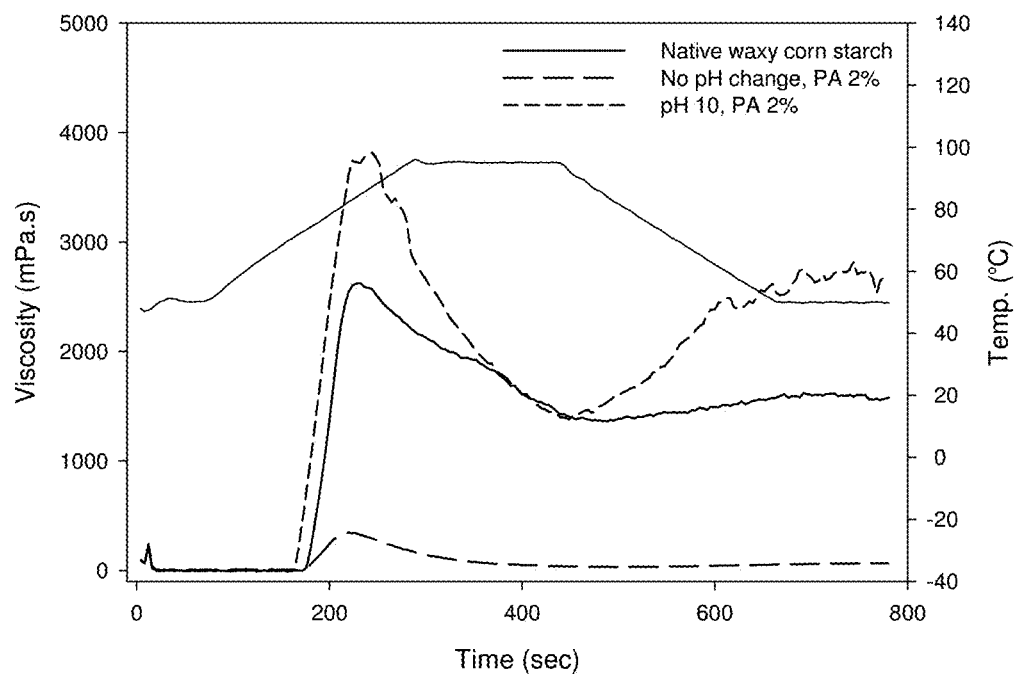
FIG. 2 graphically shows the pasting properties of waxy corn starch phosphates prepared using phytate at different pH values of dispersion in Example 1-2, which were measured using a rapid visco analyzer (RVA).

As shown in FIG. 2, dispersion of starch-phytate mixture in distilled water resulted in a drastic reduction in the viscosity of the starch phosphate due to strong acidity of phytate These results reveal that the pH of the starch-phytate dispersion was a factor that had a great influence on the modification of the starch. The pH condition, particularly pH≥7, was found to have a positive influence on the modification of the starch with phytate.

(2) Normal corn starch dispersion (40 wt %) was prepared with phytate (2%, w/w, starch basis) in distilled water. The pH values were adjusted to different values (4, 5, 7, 8.5, 9, 10, 11, or 11.5) using a sodium hydroxide solution and a hydrochloric acid solution. Thereafter, the starch-phytate dispersion was stirred at ambient temperature for 1 h. The dispersion was dried in a convection oven at 40° C. and powdered. The powder was heated at 120° C. for 6 h, dispersed in water for neutralization, washed three times with water, and dried in a convection oven at 40° C. to prepare a starch phosphate. The starch phosphate was pulverized before use in the following experiments.

Next, the pasting properties of the starch phosphate were measured by the same procedure as described in 1-1. The results are shown in FIG. 3.

Figure 3:
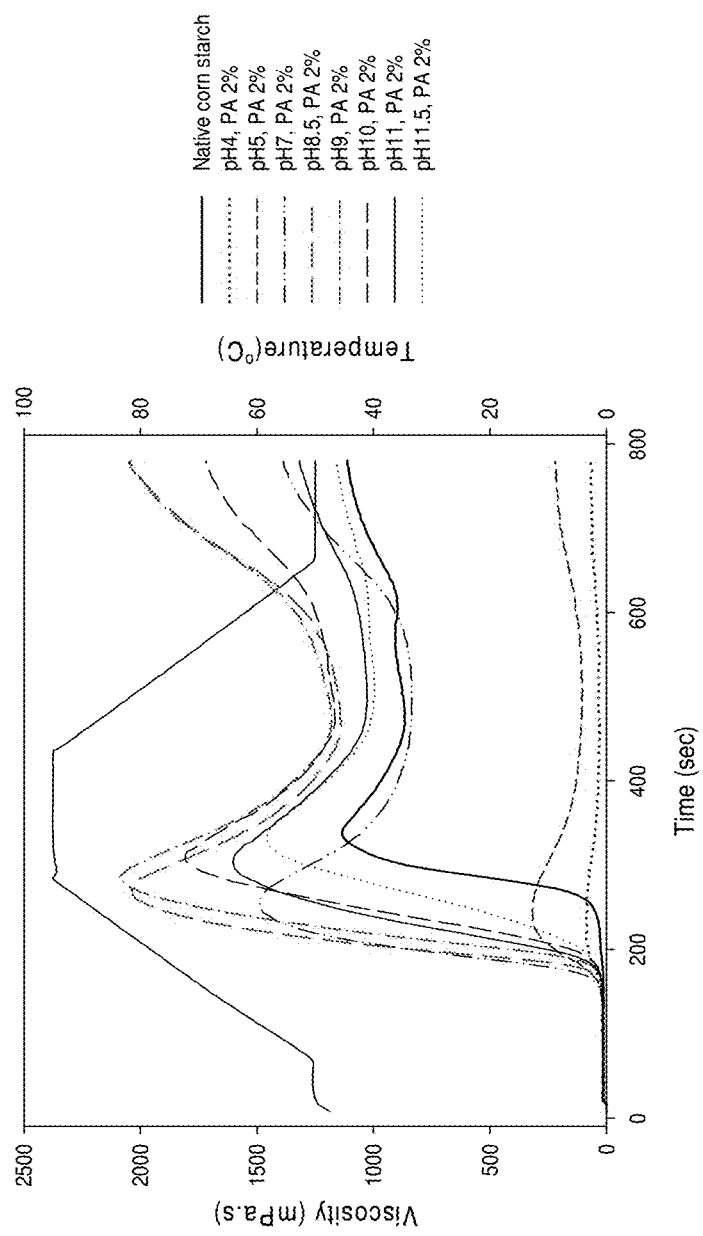
FIG. 3 graphically shows the pasting properties of normal corn starch phosphates prepared using phytate at different pH values of dispersion in Example 1-2, which were measured using a rapid visco analyzer (RVA).

As shown in FIG. 3, dispersions at different pH values (4-11.5) induced different pasting properties of normal corn starch phosphates. The most drastic changes in pasting properties were found in the starch phosphates prepared using the dispersions in the pH range of 7-10. In contrast, the starch phosphates prepared using the dispersions under the acidic conditions (pH 4-5) were observed to have very low viscosities. Although higher viscosity was observed in the starch phosphates prepared at pH≥10 than in native starch, changes in the viscosity were smaller in the starch phosphates prepared at pH≥10 than at pH 7-9. These results reveal that the starch was phosphorylated at a pH of at least 7, and excellent pasting properties were obtained due to phosphorylation of the starch at a pH 8-9.

1-3. Measurement of Pasting Properties of Starch Phosphates at Different Heating Time and Temperature (1) Waxy corn starch dispersion (40 wt %) was prepared with phytate (2%, w/w, starch basis) in a 0.1 M buffer at pH 10. The mixture was dispersed with stirring at 50° C. for 1 h. Then, the dispersion was dried in a convection oven at 40° C. and powdered. This powdered mixture was left standing without heat treatment or was heated under different conditions: at 120° C. for 6 h, at 120° C. for 24 h or at 130° C. for 2 h. Heat treated starch-phytate mixture was dispersed in water for neutralization, washed three times with water, and dried in a convection oven at 40° C. to prepare a starch phosphate. The starch phosphate was pulverized before use in the following experiments.

Next, the pasting properties of the starch phosphates were measured by the same procedure as described in 1-1. The results are shown in FIG. 4.

Figure 4:
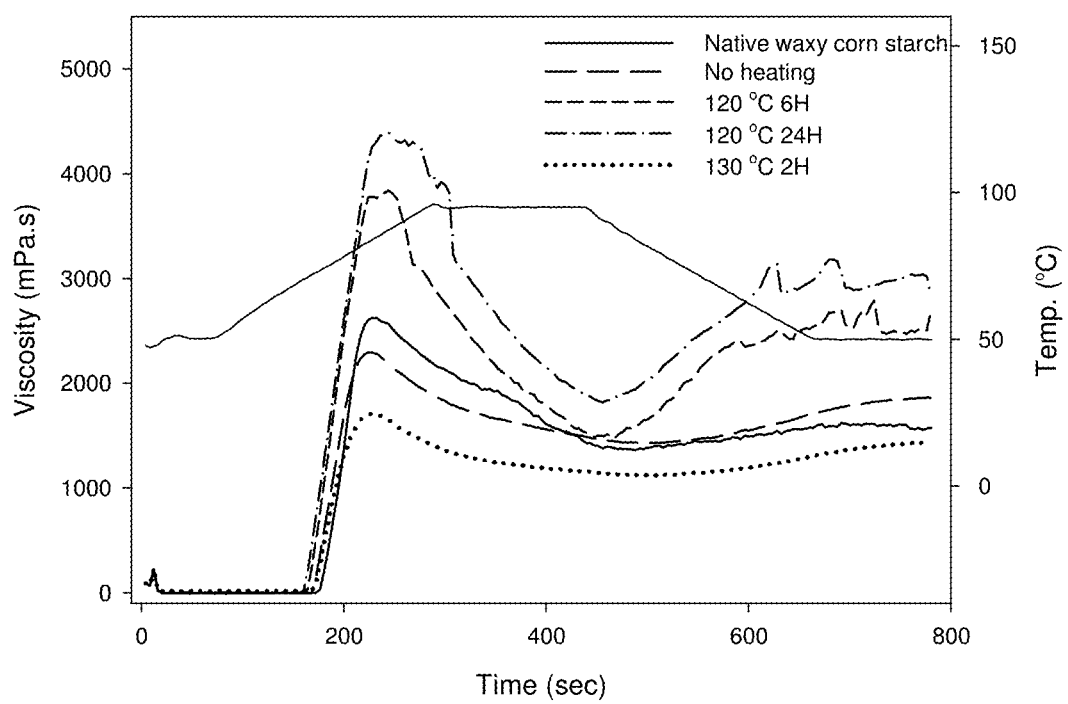
FIG. 4 graphically shows the pasting properties of waxy corn starch phosphates prepared using phytate at different heating temperature and time in Example 1-3, which were measured using a rapid visco analyzer (RVA).

As shown in FIG. 4, starch-phytate without heat treatment had a lower peak viscosity than the native starch and showed a tendency to slightly increase in final viscosity. But, there was no significant change in the pasting properties between native starch and starch-phytate without heat treatment. In contrast, heating of starch-phytate mixture in accordance with the inventive method induced low pasting temperature, high peak and final viscosity of starch. In addition, the peak and final viscosities of the starch phosphate treated at 120° C. for 24 h were observed to be dramatically high compared to those of the starch phosphate treated at 120° C. for 6 h. In contrast, the viscosity of the starch phosphate prepared by heating at 130° C. for 2 h showed a tendency to decrease compared to that of the native starch. These results reveal that heat treatment at 120° C. induced the highest starch modification efficiency in the starch phosphate when pH 10 buffer was used for dispersion.

(2) Normal corn starch dispersion (40 wt %) was prepared with phytate (2%, w/w, starch basis) in a distilled water. The pH of dispersion was adjusted to pH 9 by adding sodium hydroxide solution. The mixture was stirred at ambient temperature for 1 h. Then, the dispersion was dried in a convection oven at 40° C. and powdered. Powder of starch-phytate mixture was heated under different conditions: at 120° C. for 24 h and 48 h and at 130° C. for 6 h, 12 h, and 24 h. Heated mixture was dispersed in water for neutralization, washed three times with water, and dried in a convection oven at 40° C. to prepare a starch phosphate. The starch phosphate was pulverized before use in the following experiments.

Next, the pasting properties of the starch phosphates were measured by the same procedure as described in 1-1. The results are shown in FIG. 5.

Figure 5:
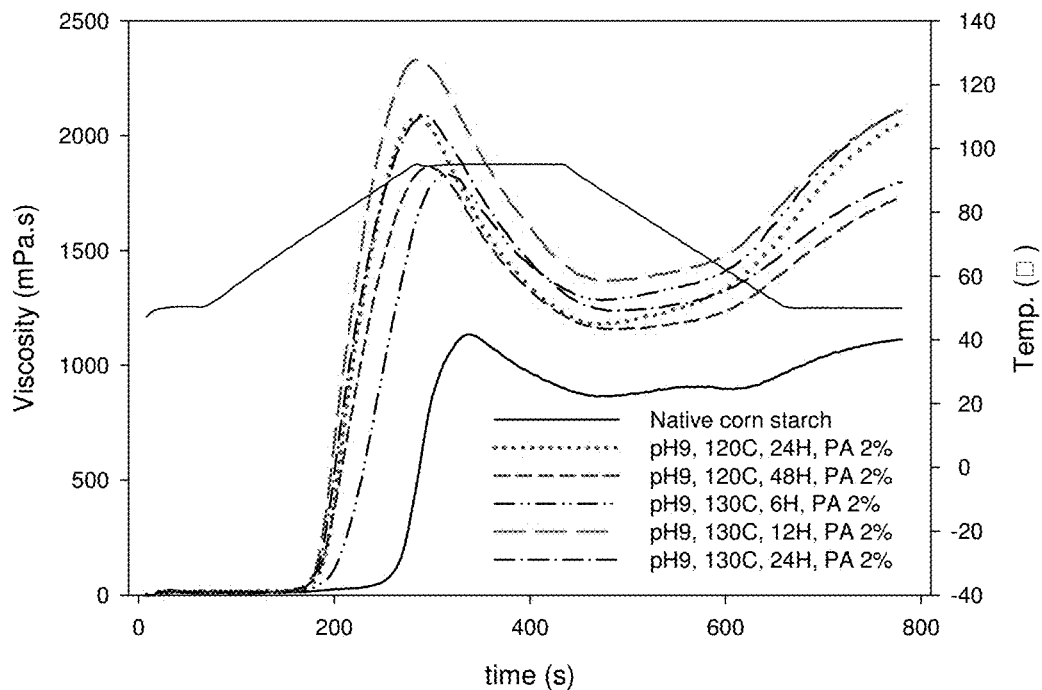
FIG. 5 graphically shows the pasting properties of normal corn starch phosphates prepared using phytate at different heating temperature and time in Example 1-3, which were measured using a rapid visco analyzer (RVA).

As shown in FIG. 5, the highest peak and final viscosities were observed in the starch phosphate prepared by heating at 130° C. for 12 h. Longer (24 h) or shorter (6 h) treatment at 130° C. induced lower viscosity of starch phosphate than 12 h treatment at 130° C., although viscosity of all starch phosphates prepared by heat treatment with phytate is higher than that of native starch. When starch-phytate was thermally treated at 120° C., 24 h treatment resulted higher peak and final viscosities of the starch phosphate than 24 h treatment. These results reveal that the highest starch modification efficiency in pasting properties was observed in the normal corn starch phosphate prepared by heating the dispersion in the pH 9 solution at 130° C. for 12 h.

1-4. Measurement of Pasting Properties of Starch Phosphate with Different Content of Phytate (1) Waxy corn starch dispersion (40 wt %) was prepared in a buffer at pH 10. The dispersion was mixed with different amounts (1 wt % or 2 wt %) of phytate with respect to the starch. Each of the mixtures was dispersed with stirring at 50° C. for 1 h. Then, the dispersion was dried in a convection oven at 40° C. and powdered. The powder was heated at 120° C. for 6 h, dispersed in water for neutralization, washed three times with water, and dried in a convection oven at 40° C. to prepare a starch phosphate. The starch phosphate was pulverized before use in the following experiments. A control starch was prepared in the same manner as described above, except that phytate was not added.

Next, the pasting properties of the starch phosphates were measured by the same procedure as described in 1-1. The results are shown in FIG. 6.

Figure 6:
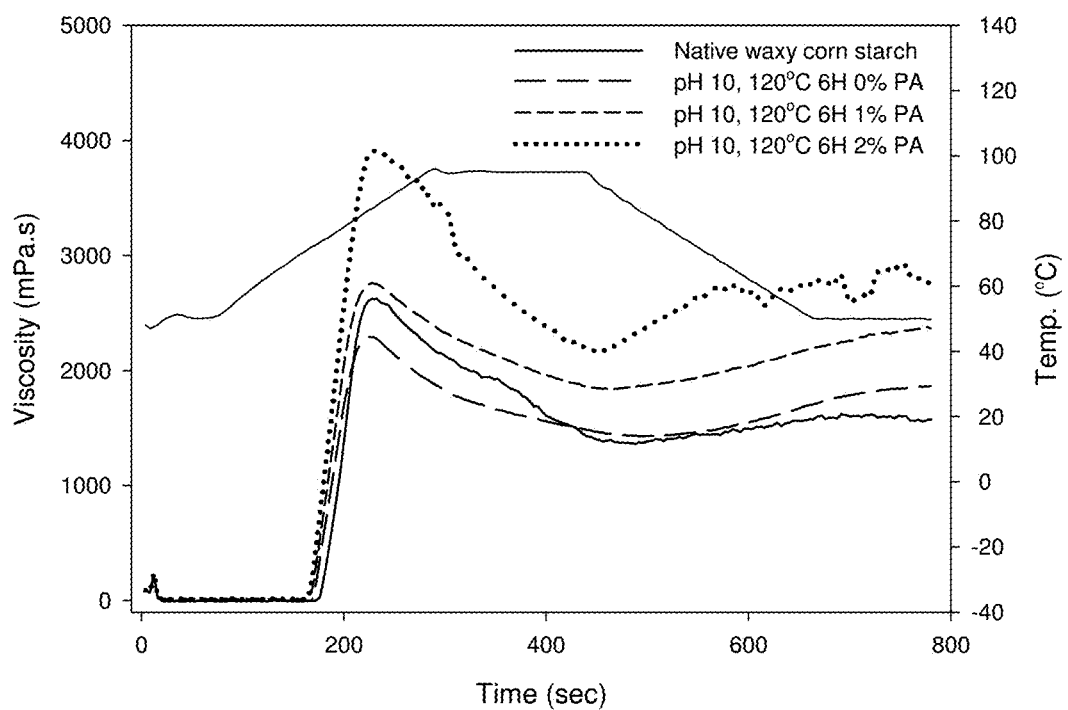
FIG. 6 graphically shows the pasting properties of waxy corn starch phosphates prepared using different amounts (0, 1, and 2%) of phytate in Example 1-4, which were measured using a rapid visco analyzer (RVA).

As shown in FIG. 6, the use of the different amount of phytate (1 and 2 wt %, starch basis) was found to greatly affect the pasting properties of the starch phosphates. Particularly, 2 wt % of phytate induced the highest peak and final viscosities of the starch phosphate.

(2) Normal corn starch dispersion (40 wt %) was prepared with phytate (2% or 5%, w/w, starch basis) in a distilled water. Then, the pH of dispersion was adjusted to pH 9 by adding sodium hydroxide solution. Each of the mixtures was dispersed with stirring at ambient temperature for 1 h. Then, the dispersion was dried in a convection oven at 40° C. and powdered. The powder was heated at 130° C. for 12 h, dispersed in water for neutralization, washed three times with water, and dried in a convection oven at 40° C. to prepare a starch phosphate. The starch phosphate was pulverized before use in the following experiments.

Next, the pasting properties of the starch phosphates were measured by the same procedure as described in 1-1. The results are shown in FIG. 7.

Figure 7:
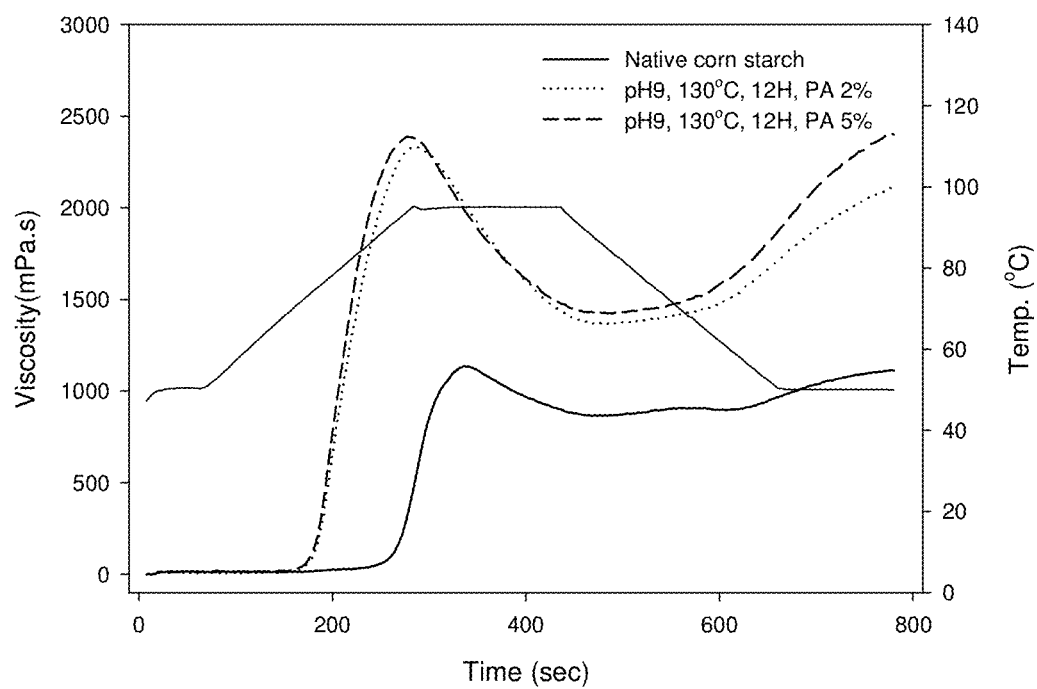
FIG. 7 graphically shows the pasting properties of normal corn starch phosphates prepared using different amounts (2 and 5%) of phytate in Example 1-4, which were measured using a rapid visco analyzer (RVA).

As shown in FIG. 7, the amount of phytate (2% and 5%, starch basis) produced no significant difference in pasting properties, although both starch phosphate showed higher pasting viscosity than native starch.

1-5. Measurement of Pasting Property of Starch Phosphate from Different Botanical Sources (1) Starches from three different botanical sources (waxy corn, waxy rice, and normal rice) were used for preparation of starch phosphate. Each starch dispersion (40 wt %) was prepared in a buffer at pH 10. The dispersion was mixed with 2 wt % of phytate with respect to the weight of the starch. The mixture was dispersed with stirring at 50° C. for 1 h. Then, the dispersion was dried in a convection oven at 40° C. and powdered. The starch-phytate mixture was heated at 120° C. for 6 h or at 120° C. for 24 h. Each of the heated portions was dispersed in water for neutralization, washed three times with water, and dried in a convection oven at 40° C. to prepare a starch phosphate. The starch phosphate was pulverized before use in the following experiments. A control starch was prepared in the same manner as described above, except that phytate was not added.

Next, the pasting properties of the starch phosphates were measured by the same procedure as described in 1-1. The results are shown in FIGS. 8a to 8c and Table 1.

Figure 8A:
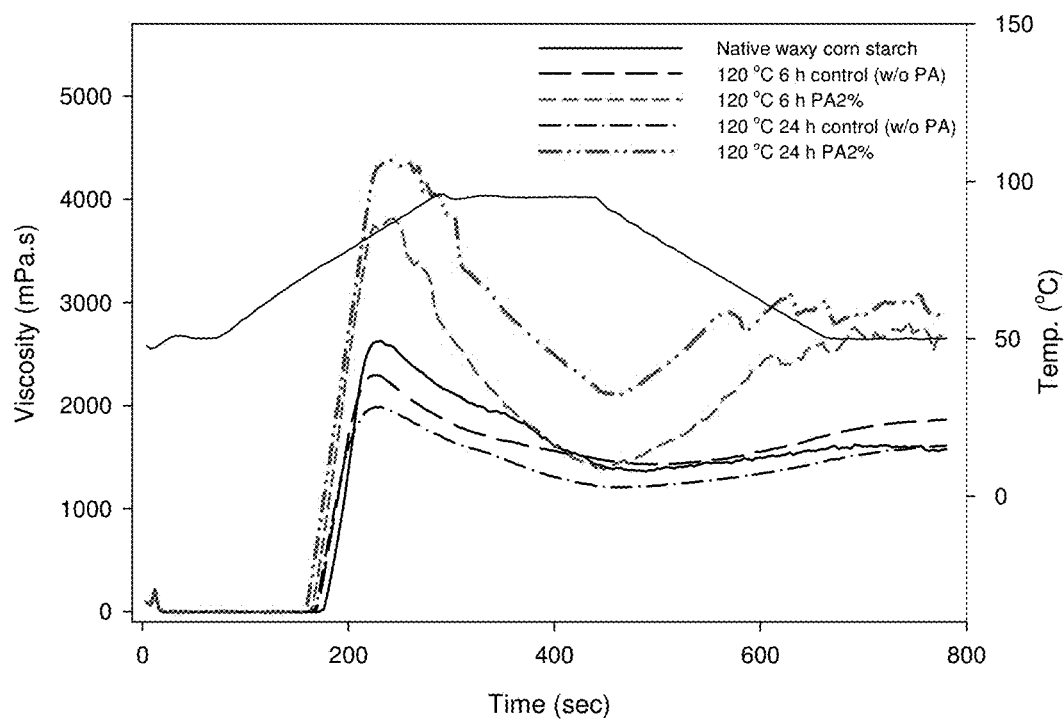
FIGS. 8a, 8b, and 8c graphically show the pasting viscosities of waxy corn starch, waxy rice starch, and normal rice starch phosphates prepared using phytate in Example 1-5, respectively, which were measured using a rapid visco analyzer (RVA).
Figure 8B:
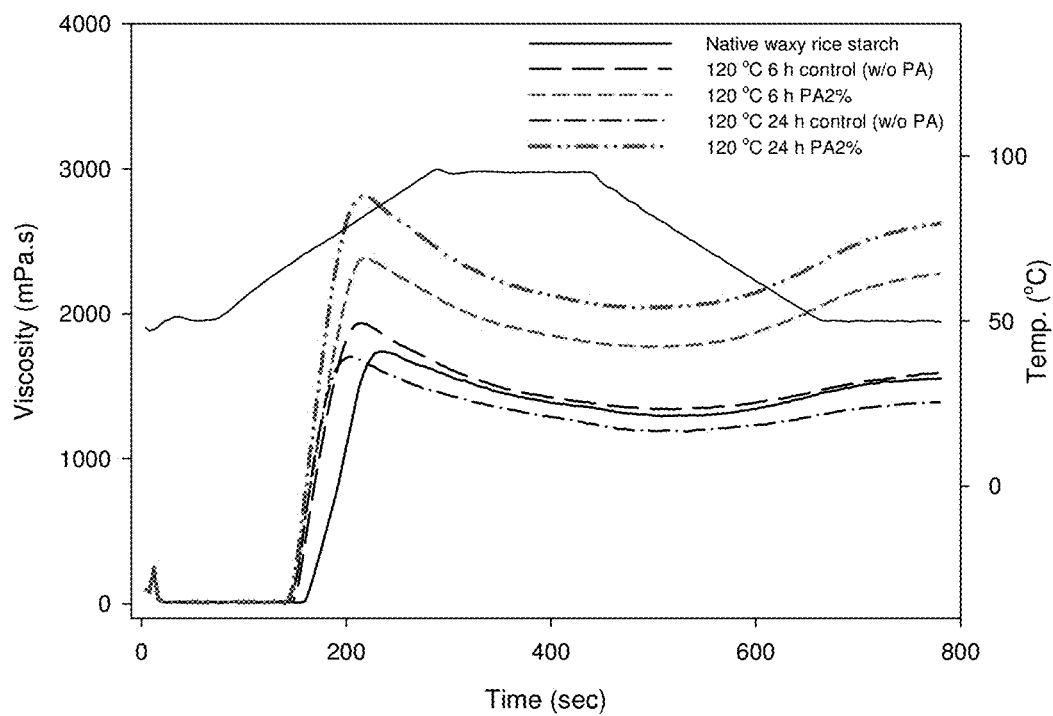
Figure 8C:
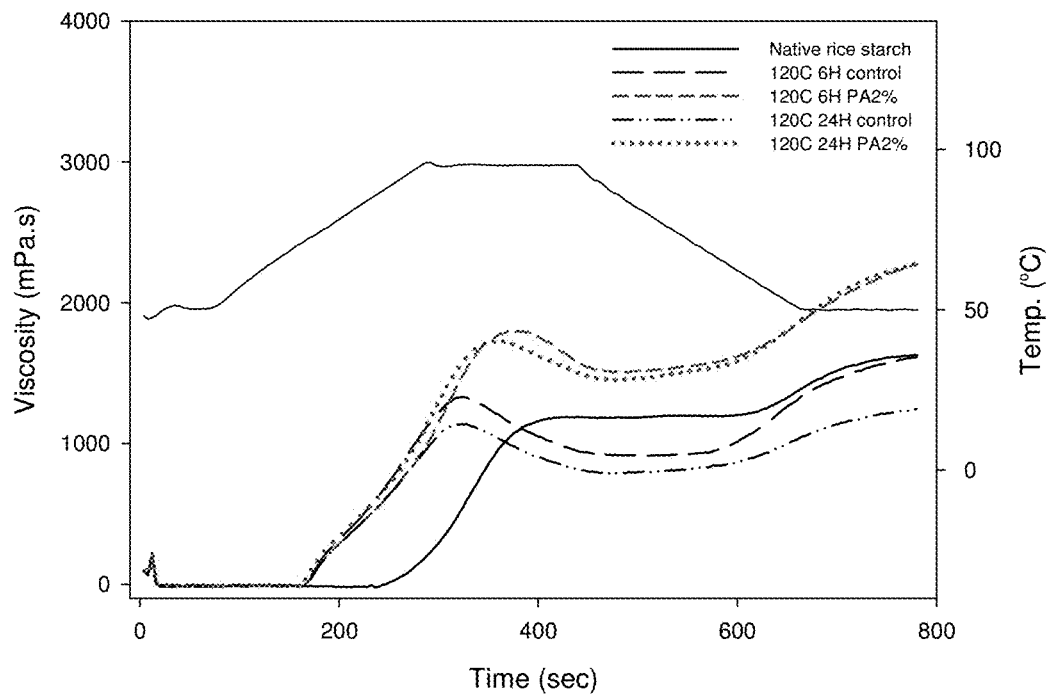

As shown in FIGS. 8a to 8c, the peak viscosity of the starch phosphates (waxy corn, waxy rice, and rice starches) was higher than that of native and control starch. This tendency was more pronounced in the waxy corn starch phosphates. When the heating time increased from 6 h to 24 h, the viscosities of the waxy rice starch and waxy corn starch phosphates increased but there were no significant changes in the viscosity of the rice starch phosphates.

TABLE 1

|  |  |  | Peak viscosity [mPa s] | Breakdown viscosity [mPa s] | Final viscosity [mPa s] | Setback viscosity | Pasting temp. (° C.) |
|---|---|---|---|---|---|---|---|
| Waxy corn starch | Native |  | 2593 ± 45 | 1239 ± 36 | 1575 ± 2 | 221 ± 6 | 72.8 ± 0.0 |
|  | 120° C. 6 H | Control | 2229 ± 93 | 799 ± 71 | 1850 ± 31 | 420 ± 10 | 72.2 ± 0.5 |
|  |  | 2% Phytate | 3792 ± 70 | 2327 ± 291 | 2647 ± 55 | 1182 ± 198 | 70.9 ± 0.8 |
|  | 120° C. 24 H | Control | 1896 ± 112 | 727 ± 64 | 1544 ± 77 | 384 ± 29 | 71.6 ± 0.5 |
|  |  | 2% Phytate | 4515 ± 140 | 2729 ± 363 | 2933 ± 88 | 1147 ± 270 | 70.0 ± 0.5 |
| Waxy rice starch | Native |  | 1744 ± 4 | 445 ± 2 | 1555 ± 4 | 256 ± 1 | 70.4 ± 0.0 |
|  | 120° C. 6 H | Control | 1835 ± 77 | 613 ± 14 | 1467 ± 94 | 244 ± 5 | 67.9 ± 0.0 |
|  |  | 2% Phytate | 2320 ± 63 | 598 ± 20 | 2180 ± 87 | 458 ± 42 | 67.2 ± 0.4 |
|  | 120° C. 24 H | Control | 1608 ± 89 | 480 ± 29 | 1322 ± 69 | 194 ± 8 | 67.6 ± 0.8 |
|  |  | 2% Phytate | 2584 ± 267 | 727 ± 97 | 2369 ± 258 | 511 ± 80 | 66.6 ± 0.4 |
| Rice starch | Native |  | 1744 ± 4 | 445 ± 2 | 1555 ± 4 | 256 ± 1 | 70.4 ± 0.0 |
|  | 120° C. 6 H | Control | 1835 ± 77 | 613 ± 14 | 1467 ± 94 | 244 ± 5 | 67.9 ± 0.0 |
|  |  | 2% Phytate | 2320 ± 63 | 598 ± 20 | 2180 ± 87 | 458 ± 42 | 67.2 ± 0.4 |
|  | 120° C. 24 H | Control | 1608 ± 89 | 480 ± 29 | 1322 ± 69 | 194 ± 8 | 67.6 ± 0.8 |
|  |  | 2% Phytate | 2584 ± 267 | 727 ± 97 | 2369 ± 258 | 511 ± 80 | 66.6 ± 0.4 |

Example 2: Measurement of Physicochemical Properties of Starch Phosphates Prepared Using Phytate 2-1. Phosphorus Contents of Native Starches, Control Starches, and Starch Phosphates Prepared by the Inventive Method Each of the starches (0.5 g) was dispersed in 2.5 mL nitric acid and 0.5 mL hydrochloric acid, heated at 90° C. for 60 min, cooled, diluted to a final volume of 50 mL with distilled water. Phosphorus content was measured by inductively coupled plasma-optical emission spectroscopy (ICP-OES). Phosphorus content of native, control, starch phosphate prepared using phytate is shown in Table 2.

TABLE 2

|  |  |  | P (ppm) |
|---|---|---|---|
| Waxy corn starch | Native |  | 11.5 ± 0.6 c |
|  | 120° C. 6 H | Control | ND |
|  |  | 2% Phytate | 50.1 ± 0.2 b |
|  | 120° C. 24 H | Control | ND |
|  |  | 2% Phytate | 92.9 ± 1.0 a |
| Waxy rice starch | Native |  | 27.5 ± 0.0 c |
|  | 120° C. 6 H | Control | ND |
|  |  | 2% Phytate | 43.1 ± 0.5 b |
|  | 120° C. 24 H | Control | ND |
|  |  | 2% Phytate | 79.3 ± 1.7 a |

ND: Not detected

Phytate is also known as hexaphosphorylated inositol. Native starches naturally contain phosphorus in the form of phytate. Native waxy corn starch and waxy rice starch were found to contain 11.5 ppm and 27.5 ppm phosphorus, respectively. Phosphorus was not detected in the control starches prepared without phytate addition because naturally existed phosphorus was lost during washing in the preparation of the starch phosphates. Phytate added to induce the phosphorylation of starches in accordance with the inventive method was bound to the starches, and as a result, phosphorus was remained in the starch phosphates after washing. Particularly, the highest phosphorus content was observed in the starch phosphates prepared by heating at 120° C. for 24 h than in those by heating at 120° C. for 6 h. The phosphorus content of the waxy corn starch phosphate prepared by heating at 120° C. for 24 h was found to be higher than that of the waxy rice starch phosphate prepared under the same reaction conditions.

2-2. pNMR Analysis of the Starch Phosphates

The starch phosphate prepared by the inventive method were enzymatically degraded. The binding pattern of the starch and phosphorus in the degradation product was analyzed by pNMR. The results are shown in FIG. 9.

Figure 9:
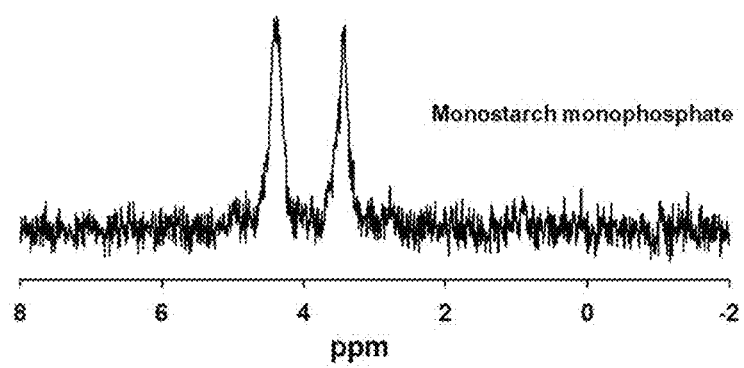
FIG. 9 shows a pNMR spectrum of a waxy corn starch phosphate prepared using phytate in Example 2-1.

The signals at 3-5 ppm in FIG. 9 demonstrate that the starch phosphate prepared using phytate by the inventive method was in the form of starch monophosphate.

Figure 10A:
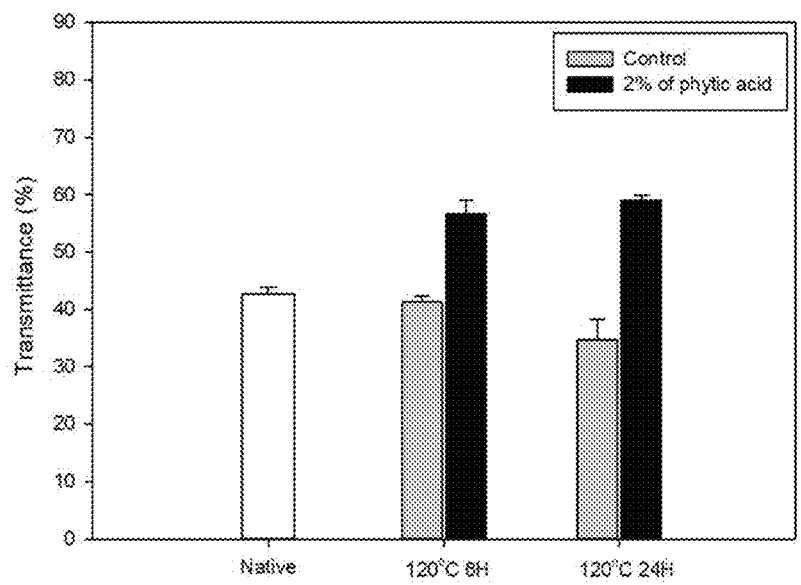
FIGS. 10a, 10b, and 10c show the transmittances of waxy corn starch, waxy rice starch, and normal rice starch phosphates prepared using phytate in Example 2-1, respectively.
Figure 10B:
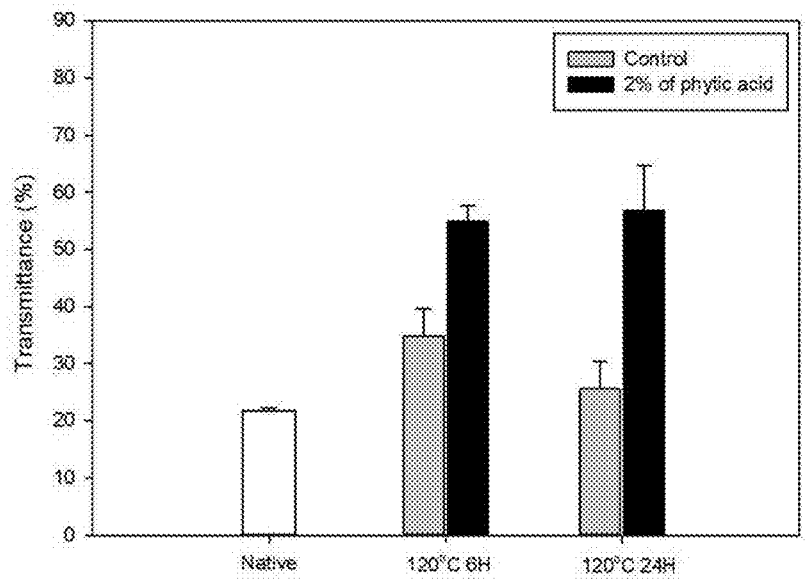
Figure 10C:
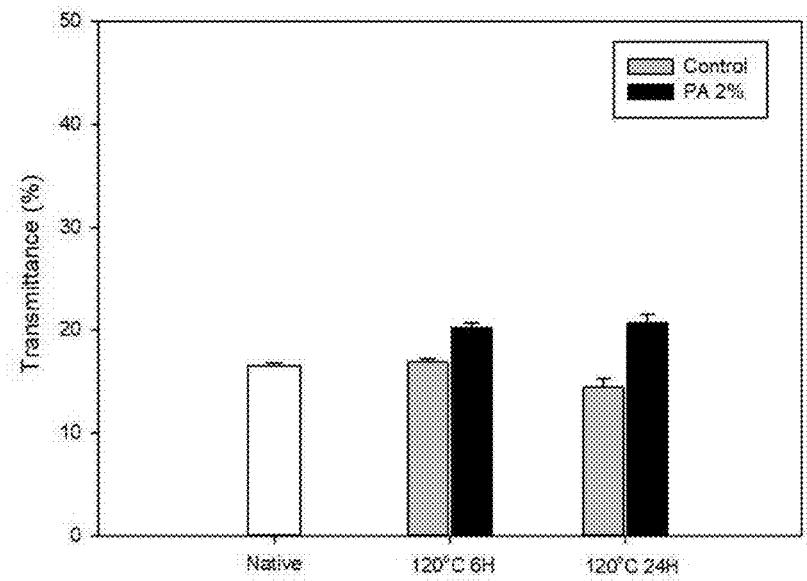

2-3. Transparency of Native Starches, Control Starches and Starch Phosphates Prepared by the Inventive Method Each of the starches (0.1 g) was dispersed in 10 mL of water, heated for 30 min, cooled, and measured for transmittance at 650 nm using a UV-Vis spectrophotometer. Transparency of native starches, control starches and starch phosphates prepared from waxy corn, waxy rice, and rice starch is shown in FIGS. 10a to 10c.

The transmittances of the starch phosphates gel from waxy corn and waxy rice were 10% higher than the corresponding native starches. In contrast, the control starches prepared without phytate addition showed transmittances similar to those of the native starches. Although rice starch phosphate had higher transmittance than native rice starch, the increase in transmittance of starch phosphate from native starch was smaller in rice starch compared to waxy corn and waxy rice starch.

2-4. Solubilities of Native Starches, Control Starches and Starch Phosphates Prepared by the Inventive Method Each of the starches (0.1 g) was dispersed in 10 mL of a distilled water. Starch dispersion were heated with stirring at 200 rpm in thermostatic baths at different temperatures of 50, 60, and 70° C., cooled to ambient temperature, and centrifuged at 3500 rpm for 15 min. The total carbohydrate contents of the supernatants were measured using a phenol-sulfuric acid solution to calculate the solubilities of the starches. Solubility of native starches, control starches, starch phosphates from waxy corn, waxy rice, and rice starch are shown in Table 3.

TABLE 3

| | | | Solubility | | |
|---|---|---|---|---|---|
| | | | 50° C. | 60° C. | 70° C. |
| Waxy corn starch | Native | | 0.29 ± 0.02c | 0.67 ± 0.12c | 1.50 ± 0.49c |
| | 120° C. 6 H | Control | 0.60 ± 0.08ab | 0.69 ± 0.01c | 2.56 ± 0.38b |
| | | 2% Phytate | 0.72 ± 0.07a | 1.26 ± 0.23a | 5.62 ± 0.29a |
| | 120° C. 24 H | Control | 0.32 ± 0.09c | 1.20 ± 0.10ab | 2.87 ± 0.31b |
| | | 2% Phytate | 0.49 ± 0.08b | 1.02 ± 0.07b | 5.38 ± 0.21a |
| Waxy rice starch | Native | | 1.43 ± 0.23b | 3.10 ± 0.23b | 6.36 ± 0.41a |
| | 120° C. 6 H | Control | 3.16 ± 0.63a | 4.36 ± 0.65a | 4.28 ± 0.29c |
| | | 2% Phytate | 3.14 ± 0.73a | 4.92 ± 0.82a | 4.88 ± 0.91bc |
| | 120° C. 24 H | Control | 3.63 ± 0.48a | 4.91 ± 0.30a | 5.64 ± 0.12ab |
| | | 2% Phytate | 3.61 ± 0.52a | 4.55 ± 0.87a | 4.93 ± 0.41bc |
| Rice starch | Native | | 0.15 ± 0.03d | 1.04 ± 0.10c | 3.70 ± 0.44c |
| | 120° C. 6 H | Control | 0.71 ± 0.05c | 3.72 ± 0.27b | 6.79 ± 0.80b |
| | | 2% Phytate | 0.73 ± 0.04c | 3.75 ± 0.16b | 6.89 ± 0.99b |
| | 120° C. 24 H | Control | 1.26 ± 0.12b | 5.49 ± 0.54a | 7.95 ± 1.43ab |
| | | 2% Phytate | 1.60 ± 0.13a | 5.89 ± 0.38a | 9.23 ± 1.35a |

As shown in Table 3, effect of phosphorylation on solubility of starch was different in waxy maize, waxy rice and rice starches. Specifically, the solubilities of the starch phosphates were greatly improved compared to those of the corresponding native starches except the solubility of the waxy rice starch phosphate measured at 70° C. The solubilities of the waxy corn starch phosphates were higher than native and control starches at 50, 60, and 70° C. due to phosphorylation of the starch with phytate. The solubilities of the starch phosphates were significantly increased at 70° C. compared to those of the control starches. In contrast, no statistically significant differences in solubility were observed between the phytate-free control waxy rice starches and the waxy rice starch phosphates prepared by phosphorylation with phytate. The rice starch phosphate prepared by heating at 120° C. for 6 h showed no significant difference in solubility compared to the corresponding control starch but the rice starch phosphate prepared by heating at 120° C. for 24 h showed a significantly increased solubility compared to the corresponding control starch.

2-5. Swelling Powers of Native Starches, Control Starches and Starch Phosphates Prepared by the Inventive Method Each of the starches (0.1 g) was dispersed in 10 mL of a distilled water. The starch dispersions were heated with stirring at 200 rpm in thermostatic baths at different temperatures of 50, 60, and 70° C., cooled to ambient temperature, and centrifuged at 3500 rpm for 15 min. The precipitates were weighed. The swelling power was defined as the ratio of the weight of the swollen precipitate to the original dry weight. Swelling powers of native starches, control starches and starch phosphates from waxy corn, waxy rice, and rice starch are shown in Table 4.

TABLE 4

| | | | Swelling power | | |
|---|---|---|---|---|---|
| | | | 50° C. | 60° C. | 70° C. |
| Waxy corn starch | Native | | 2.46 ± 0.15b | 3.80 ± 0.22d | 15.98 ± 0.73c |
| | 120° C. 6 H | Control | 2.60 ± 0.15b | 4.04 ± 0.32cd | 14.59 ± 0.92c |
| | | 2% Phytate | 2.99 ± 0.08a | 4.99 ± 0.26b | 22.54 ± 0.65b |
| | 120° C. 24 H | Control | 2.69 ± 0.14b | 4.44 ± 0.29bc | 12.09 ± 1.01d |
| | | 2% Phytate | 3.19 ± 0.29a | 7.02 ± 0.37a | 26.00 ± 1.78a |
| Waxy rice starch | Native | | 2.80 ± 0.07d | 8.78 ± 0.62c | 17.68 ± 2.23a |
| | 120° C. 6 H | Control | 3.64 ± 0.14c | 9.38 ± 0.25c | 13.08 ± 0.18c |
| | | 2% Phytate | 4.91 ± 0.16b | 10.93 ± 0.32b | 13.75 ± 0.64bc |
| | 120° C. 24 H | Control | 3.75 ± 0.23c | 8.89 ± 0.32c | 12.95 ± 0.20c |
| | | 2% Phytate | 5.55 ± 0.31a | 11.65 ± 0.42a | 15.35 ± 0.45b |
| Rice starch | Native | | 2.34 ± 0.02d | 4.89 ± 0.19d | 9.99 ± 0.28d |
| | 120° C. 6 H | Control | 2.83 ± 0.12c | 7.11 ± 0.05c | 13.58 ± 0.47c |
| | | 2% Phytate | 3.16 ± 0.14b | 8.30 ± 0.15b | 15.46 ± 0.40b |
| | 120° C. 24 H | Control | 3.04 ± 0.17b | 7.42 ± 0.21c | 12.93 ± 0.51c |
| | | 2% Phytate | 3.35 ± 0.09a | 10.94 ± 0.33a | 17.68 ± 1.15a |

The swelling powers of the starch phosphates were found to be significantly high compared to those of the corresponding native or control in waxy corn and rice starch. Longer heating for 24 h at 120° C. induced much higher swelling powers of starch phosphates than short heating for 6 h at 120° C. Similarly to the solubility results, the swelling powers of the waxy rice starch phosphates at 50° C. and 60°

C. were greater than those of the native and control starches. However, the swelling power of the waxy rice starch phosphate at 70° C. was lower than those of native starch.

Based on these results, it was found that the particles of the waxy corn and rice starch phosphates were more likely to swell and the molecules of the starches were more readily dissolved due to the interactions of the starches with phytate. In addition, the particles of the waxy rice starch phosphates less swelled and the molecules of the starches were less dissolved with increasing temperature.

2-6. Gel Textures of Native Starches, Control Starches and Starch Phosphates Prepared by the Inventive Method During Storage Starch dispersions (9%) were gelatinized and stored for different periods of time (2, 4, and 6 days). The starch gels were measured for texture. Hardness, springiness, cohesiveness, and chewiness of native starches, control starches and starch phosphate from waxy rice and rice starches are shown in Table 5.

TABLE 5

|  |  |  | 2 Days | | | | 4 Days | | | | 6 Days | | | |
|---|---|---|---|---|---|---|---|---|---|---|---|---|---|---|
|  |  |  | Hardness (g) | Springiness | Cohesiveness | Chewiness | Hardness (g) | Springiness | Cohesiveness | Chewiness | Hardness (g) | Springiness | Cohesiveness | Chewiness |
| Waxy rice starch | Native | | 26.8 | 0.92 | 0.67 | 17.0 | 29.7 | 0.93 | 0.66 | 18.7 | — | — | — | — |
| | 120° C. 6 H | Control | 52.8 | 0.97 | 0.73 | 41.9 | 48.9 | 1.00 | 0.81 | 39.3 | — | — | — | — |
| | | 2% Phytate | 39.1 | 0.93 | 0.67 | 53.5 | 70.2 | 0.95 | 0.76 | 52.1 | — | — | — | — |
| | 120° C. 24 H | Control | 50.9 | 1.05 | 0.74 | 46.3 | 54.3 | 0.94 | 0.73 | 37.2 | — | — | — | — |
| | | 2% Phytate | 30.9 | 0.89 | 0.70 | 19.3 | 94.4 | 0.94 | 0.80 | 72.9 | — | — | — | — |
| Rice starch | Native | | 60.5 | 0.83 | 0.66 | 33.7 | 66.8 | 0.83 | 0.58 | 33.7 | 51.5 | 0.83 | 0.72 | 30.7 |
| | 120° C. 6 H | Control | 54.7 | 0.86 | 0.61 | 28.7 | 62.3 | 0.81 | 0.55 | 33.4 | 68.3 | 0.86 | 0.73 | 42.8 |
| | | 2% Phytate | 56.9 | 0.86 | 0.61 | 29.8 | 57.2 | 0.81 | 0.53 | 24.1 | 187.0 | 0.85 | 0.74 | 119.4 |
| | 120° C. 24 H | Control | 20.0 | 0.90 | 0.61 | 10.9 | 21.5 | 0.86 | 0.55 | 10.2 | 56.1 | 0.85 | 0.66 | 31.5 |
| | | 2% Phytate | 29.5 | 0.88 | 0.67 | 17.4 | 20.9 | 0.87 | 0.63 | 11.5 | 170.2 | 0.87 | 0.67 | 108.1 |

As can be seen from the results in Table 5, the hardness and chewiness values of the starch phosphates prepared by the inventive method were different from those of the corresponding native starches. Specifically, the hardness and chewiness values of the waxy rice starch phosphates were lower than those the control starches on day 2. However, the hardness and chewiness values of the waxy rice starch phosphates were higher than those the control starches on day 4. There were no significant differences in springiness and cohesiveness between the starch phosphates and the control starches irrespective of the storage period. In case of rice starch, hardness and chewiness of starch phosphates is lower than those of native starch after storage of 2 days and 4 days. Longer heating treatment (24 h) was effective to decrease the hardness values of the rice starch phosphate gel than shorter heat treatment (6 h).

Based on these results, it was found that the hardness and chewiness values of some of the starch phosphates prepared by the inventive method were lower than those of the corresponding native starches depending on the heating conditions but the hardness and chewiness of the starch phosphates prepared by the inventive method increased sharply from certain time points with increasing storage period.

Although the particulars of the present disclosure have been described in detail, it will be obvious to those skilled in the art that such particulars are merely preferred embodiments and are not intended to limit the scope of the present invention. Therefore, the true scope of the present invention is defined by the appended claims and their equivalents.

What is claimed is:

1. A method for preparing a starch phosphate comprising:
    dispersing a mixture of phytate and starch in a solution to prepare a phytate-starch dispersion having a pH of 7-10;
    drying the phytate-starch dispersion to obtain a phytate-starch powder; and
    heating the phytate-starch powder to induce a reaction between the phytate and the starch to obtain the starch phosphate.

2. The method according to claim 1, further comprising neutralizing and washing the obtained starch phosphate.

3. The method according to claim 2, further comprising drying and pulverizing the neutralized and washed starch phosphate.

4. The method according to claim 1, wherein the starch is selected from the group consisting of native starches, comprising normal corn starch, waxy corn starch, high amylose starch, rice starch, waxy rice starch, high amylose rice starch, potato starch, sweet potato starch, tapioca starch, sorghum starch, wheat starch, sago starch, chestnut starch, bean starch, and mixtures, and modified starches thereof.

5. The method according to claim 1, wherein the phytate is used in an amount of 1 to 5% (w/w), based on the weight of the starch.

6. The method according to claim 1, wherein the drying is performed at a temperature of 30 to 50° C.

7. The method according to claim 1, wherein the heating is performed at 110 to 130° C. for 2 to 24 hours.

8. The method according to claim 1, wherein the solution comprises $NaHCO_3$, NaOH, or a mixture thereof.

9. The method according to claim 1, wherein the solution comprises a gelatinization inhibitor.

10. The method according to claim 9, wherein the gelatinization inhibitor is $Na_2SO_4$.

11. The method according to claim 9, wherein an amount of the gelatinization inhibitor is 1 to 10 wt % based on a weight of the starch.

12. The method according to claim 1, a concentration of the phytate-starch dispersion is 50 to 70 wt % based on a weight of the solution.

* * * * *